United States Patent [19]
Jerie

[11] 4,097,134
[45] Jun. 27, 1978

[54] PROJECTION DEVICE

[76] Inventor: Hans G. Jerie, 15, Demmerskamp, Lonneker, Netherlands

[21] Appl. No.: 661,003

[22] Filed: Feb. 24, 1976

[51] Int. Cl.² ............... G03B 21/00; G03B 21/20; G03B 21/26; G03B 21/14
[52] U.S. Cl. ............... 353/11; 353/42; 353/86; 353/94; 353/101
[58] Field of Search ............... 353/11, 12, 94, 27 R, 353/27 A, 101, 21, 82, 83, 86, 42

[56] References Cited
U.S. PATENT DOCUMENTS

| | | | |
|---|---|---|---|
| 2,130,562 | 9/1938 | Pratt | 353/26 R |
| 2,558,999 | 7/1951 | Aldrich | 353/110 |
| 3,045,541 | 7/1962 | Bregman | 353/82 |
| 3,319,517 | 5/1967 | Rondas et al. | 353/27 R |
| 3,674,350 | 7/1972 | Staiger | 353/27 R |

FOREIGN PATENT DOCUMENTS

| | | | |
|---|---|---|---|
| 1,213,251 | 1/1959 | France | 353/101 |
| 361,415 | 5/1962 | Switzerland | 353/21 |

Primary Examiner—Steven L. Stephan
Attorney, Agent, or Firm—Spencer & Kaye

[57] ABSTRACT

A projection device provided with at least two different enlarging projection systems for the projection on a screen of a set of at least two slides provided on one carrier, said slides covering the same area of a plan or map, one slide being more detailed than the other. The device projects the first less detailed slide entirely and the second or next, more detailed slide only in part but on a larger scale.

The device comprises further a transparent runner indicating on the first slide the part of the next slide that is projected.

8 Claims, 5 Drawing Figures

PROJECTION DEVICE

BACKGROUND OF THE INVENTION

The invention relates to a projection device for the clarification of data from maps, plans or other information carriers.

Reading maps and plans presents great problems if data from large areas printed on a large scale are needed particularly with sufficiently detailed information and when reading has to take place in a restricted space such as a car, a plane or a vessel. Then small-scaled maps are used to make a survey of a large area, and large-scaled maps are used for a small area with much detailed information. On both kinds of maps, adapted symbols are provided. To enable the use and storage of these maps in a small space the maps are folded in a specific way, which on reading of the maps presents considerable problems, in particular at the folds. Also when the maps are divided into small pages which are assembled into a road-atlas, it is often difficult to quickly find the adjacent map somewhere else in the book.

For the average map-reader it is very difficult to find corresponding geographical positions on maps with different scales. When the map-reader has to do this in a vehicle and as often occurs, in semi-darkness and in a very restricted space, the difficulties increase. For a driver who has to keep his eye on the road and can only look at the map sideways, it is difficult indeed to determine the position of the vehicle with respect to the map.

The drawbacks outlined can largely be met by a projection device according to the invention.

SUMMARY OF THE INVENTION

For that purpose, according to the invention the projection device is provided with a double projection system with a projection screen on to which two images can be projected, one projection system projects the image of the entire picture carried by a first diapositive, there being disposed on the diapositive a transparent runner with a window. The other projection system includes an optic connected to the runner and arranged to project an enlarged image of a section of a second diapositive carrying a picture of the same area as the first, the location of the section being determined by the position of the window of the runner, preferably in such a way that the projection of the image of the section is as large as or substantially as large as, that of the projected image of the entire area.

In a projection device according to the invention, it may be preferable to arrange the optical axes of both projection systems convergently such that the point of intersection of the optical axes is situated on the projection screen, and the picture of the entire area and the picture of the section can be selectively projected on the same part of the projection screen, one of the pictures being visible on the projection screen, by switching on the lighting of one of the projection systems.

Preferably, the device according to the invention can be loaded with a carrier provided with at least two diapositives of the same area, on an equal scale but with different detail densities. These diapositives form a pair, each slide of which can be projected onto the projection screen by a projection system of its own and with an enlargement of its own.

Preferably, the runner of the device according to the invention is movable in two directions over the first diapositive of a pair. In the window a mark is provided for marking a desired position on the diapositive, when it is projected. On projection of the second diapositive of the pair, the direct surroundings of this position are shown on a much larger scale.

In an other construction of the device according to the invention, the path of rays of at least one projection system is reflected with the aid of mirrors and/or prisms and the diapositives take the form of small microfilm pictures on the carrier, so that the entire device is constructed in a compact manner and, for instance, can be mounted on the dashboard of the vehicle.

In an extension of the device according to the invention the carrier is provided with more than one pair of slides, the first pair of slides covering a map of a country and following partial pairs of slides each covering part of the country on a larger scale. The partial pairs of slides are indicated on the first pair of slides by frames or indices and have a fixed order on the carrier. In so doing, the device can be programmed such that when the measuring mark on the runner exceeds the frame limits of a part, the partial pair of slides of the adjacent part automatically can be brought under the projection system.

BRIEF DESCRIPTION OF THE DRAWING

The invention is further elucidated below with reference to a drawing.

DESCRIPTION OF THE PREFERRED EMBODIMENTS

Figure 1:
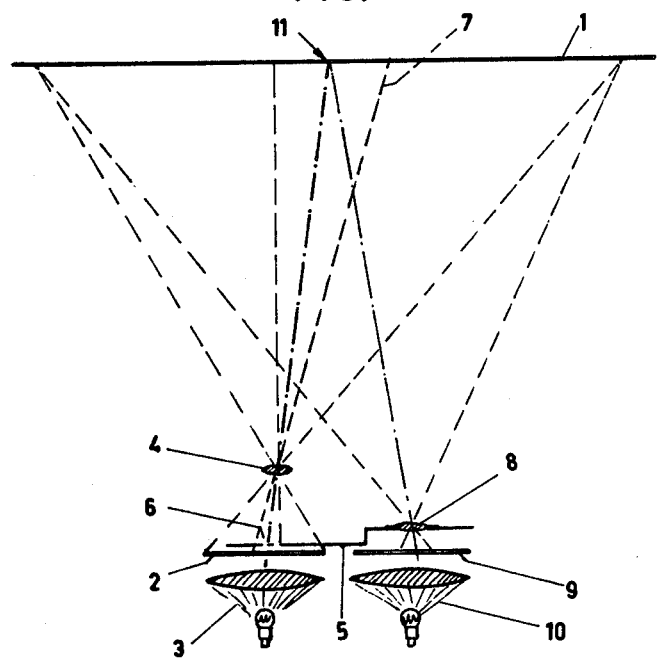
FIG. 1 schematically shows the principle of the projection device according to the invention in an embodiment, both pictures being projected on the same location on a projection screen.

According to the drawing, 1 is a projection screen onto which pictures of slides can be projected. A picture may originate from a slide 2, which is lighted by light source 3, the beam of light being thrown through a fixed lens 4. The total picture of slide 2 appears on projection screen 1. Coordinating optical means are used for projecting related portions of a pair of diapositives into each optical axis for projection. Right over slide 2 there is a transparent movable runner 5 with a window 6; and this window marks a movable section 7 of the picture on projection screen 1.

A lens 8 connected to runner 5 is situated over a second slide 9, which lies next to slide 2. Slide 2 and slide 9 form a pair and may be slides of a map of the same country or the same region on the same scale, slide 9 is much more detailed, however, and, being provided with many more indications and symbols than slide 2, is appropriate for projection on a larger scale.

Under slide 9 there is a light source 10 with the aid of lens 8 a highly magnified picture can be projected on to projection screen 1 from the part of slide 9 marked by the position of window 6 in runner 5. By switching on light source 3 or 10 according to choice, either a picture of the entire map, or a highly magnified picture of a part of the map with many more details is projected onto projection screen 1. in this embodiment the optical axes of both projection systems intersect at point 11 on the projection screen and the factor of magnification, for instance, is 5.

In this embodiment the projections of the slides overlap each other on part of projection screen 1.

When projection screen 1 is large the projection systems of slides 2 and 9 can be directed in a way such that the pictures of the slides come to lie side by side. Then both light sources can be switched on together, for instance, the left-hand picture being the projection of the complete slide 2 and the right-hand picture the 5 times enlarged projection of the section of slide 9 determined by runner 5. Both projection systems must be constructed such that the pictures on the projection screen are sharp under all conditions.

Figure 2:
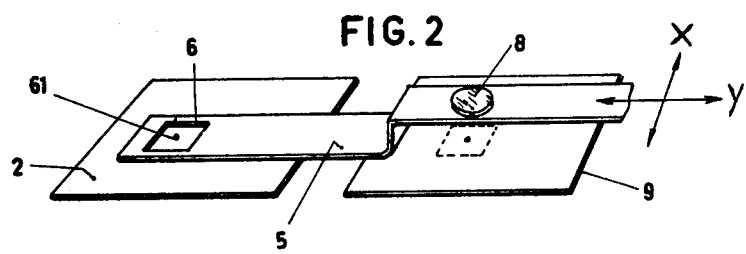
FIG. 2 perspectively shows the situation of a pair of slides in respect of a runner of the device.

With the aid of a simple displacing mechanism that in FIG. 2 is indicated schematically with the aid of crossed arrows, runner 5 can be shifted over slides 2 and 9 in the X and Y directions. It is therefore possible to obtain from each part of slide 2 as marked by the position of window 6, the 5 times enlarged picture of the corresponding part of slide 9 projected onto projection screen 1.

A central measuring mark 61 which is projected onto projection screen 1 is provided in window 6 of runner 5. The reader of the map can mark his position on slide 2 using measuring mark 61, and for further information switch over to slide 9. The area on slide 9 corresponding to the marked position on slide 2 lies in the magnified picture in the center of projection screen 1, so looking for it in the enlargement becomes superfluous.

Figure 3:
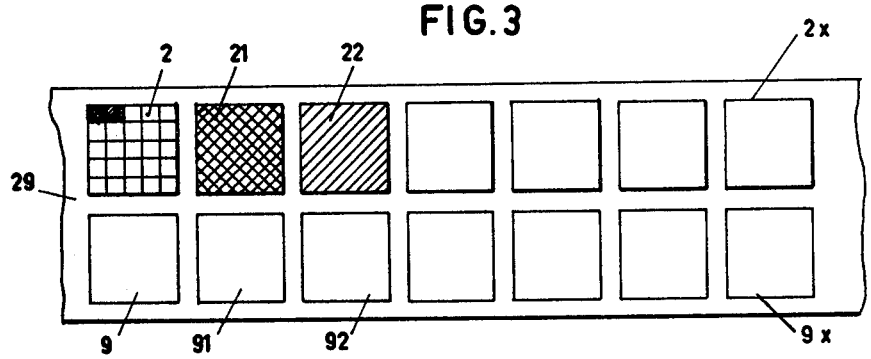
FIG. 3 shows an embodiment of a carrier of pairs of slides.

If slides 2 and 9 relate to a relatively small area, one pair of slides will suffice. If the area is larger, then on slide 2 divisions can be provided which consist, for example, of four lines dividing the slide into equal sections in one direction, and four lines dividing the slide into equal sections in a perpendicular direction, such as are indicated in FIG. 3 in slide 2. The pair of slides 2 and 9 are positioned on an oblong carrier 29; next to slides 2 and 9 are positioned pairs of partial slides 21–91, 22–92 ... 2x-9x ... etc., each pair of partial slides relating to a twenty-fifth part of the first pair of slides 2–9. The pairs of partial slides are analogous in their make-up to the pair of slides 2–9 and are read in the same way the only difference being that the projection of the picture of slides 91 to 9x now are magnified 25 times with respect to the projection of the picture of slide 2, and so can give more specific detailed information. In this embodiment carrier 29 contains 26 pairs of slides, which can be embodied as a strip that can manually be shifted in the projection device with respct to light sources 3 and 10. In an other design, strip 29 can be embodied as a film strip that is wound on a spool; in so doing, the small pictures to be projected are brought right under lenses 4 and 8.

In still another embodiment carrier 29 can be implemented as a disk that rotates around a central point. Then the pairs of slides are distributed over the circumference on the disc on two concentric graduated circles, one for slides series 2, 21, 22 ... 2x ... etc. and one for the detailed information with the slides series 9, 91, 92, ... 9x ... etc. For each country, or in the case of a large country, for each large part of a country, a separaate disc can be used.

If carrier 29 is implemented as a screen reel and is stored on sppols, for instance in a cassette, it is possible to carry the subdivision further; and as far as is needed the pairs of partial slides can be divided into zones. In so doing, the subdivision can be carried so far that finally pairs of slides of towns or districts of towns and villages are represented as plans.

If for the movement of carrier 29 use is made of electronic equipment, it is possible to relinquish the visual determination of which pair of partial slides is to be positioned by having the electronic equipment react to the location of runner 5. If, on shifting runner 5, measuring mark 61 exceeds a frame line of a division in slide 2 then after pushing a knob, the pair of partial slides 2x-9x, which abuts on the frame line that is exceeded, is placed automatically in front of light sources 3 and 10.

Figure 4:
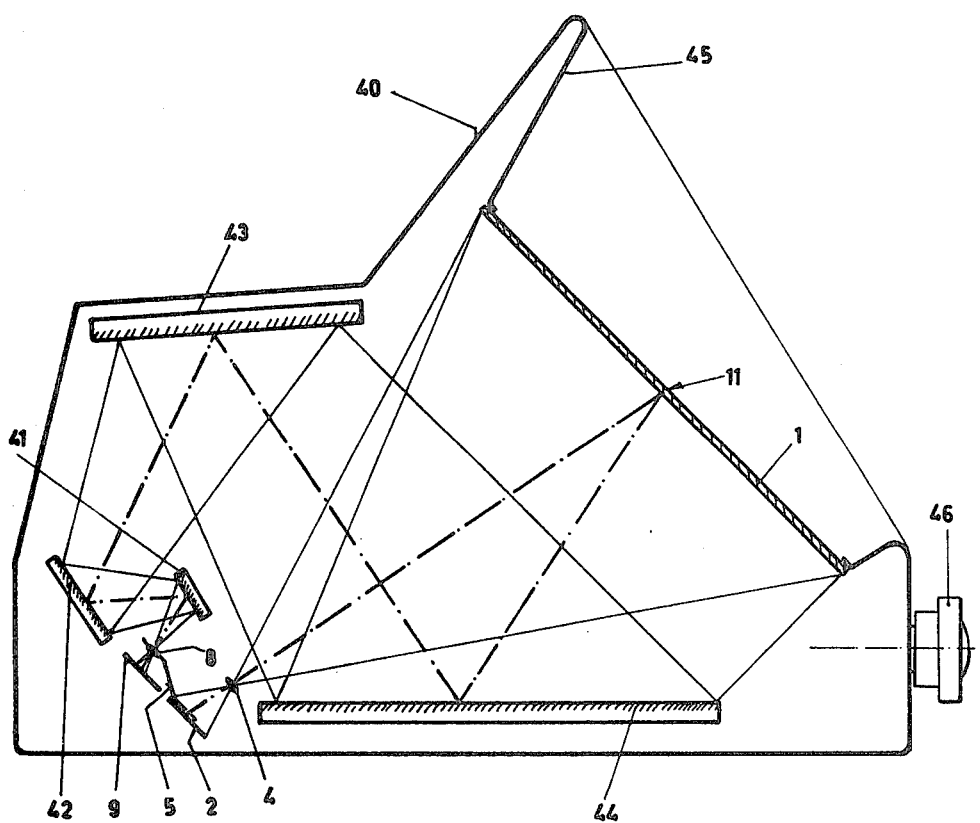
FIG. 4 shows an embodiment of a projection device according to the invention in section.

FIGS. 1, 2 and 3 show the essential components of one embodiment. FIG. 4 shows a sectional view of another embodiment such as could be used in a car or other vehicle in which space is limited. Slides 2 and 9 are placed in a housing 40 with runner 5 above them. In accordance with the embodiment as shown in FIGS. 1 and 2, a window 6 with measuring mark 61 and a lens 8 are provided. Light sources 3 and 10 are not shown, nor is the moving mechanism for carrier 29 nor the moving mechanism of runner 5. The path of rays through slide 2 travels directly through lens 4 to screen 1 so that a complete picture of slide 2 can be produced. The path of rays through slide 9 travels through movable lens 8 successively to mirrors 41, 42, 43 and 44 and then comes also on screen 1. Thus the latter picture is the magnification of the part of slide 9 determined by window 6. Using this arrangement, the axes of the two projection systems converge on screen 1. In order to avoid inconvenient light reflections, screen 1 is housed in housing 40 within a protruding sun canopy 45.

For purposes of switching on the desired projection system, displacing runner 5 and changing pairs of slides 2–9, a row of knobs 46 is mounted at the front of housing 40. One of knobs 46 is the switch for light sources 3 and 10 by which the pictures of slides series 2, 21, 22, ... 2x ... etc. or the pictures of slides series 9, 91, 92, ... 9x ... etc. are projected on screen 1. By pulling in or pulling out the knob, the brightness of the picture can be adjusted in response to the prevailing light strength of the environment. Another knob 46 can effect by rotation the movement of runner 5 in the lateral, or X-direction, and a next knob 46 likewise can effect the movement in the vertical, or Y-direction. The movement in the X and Y directions can also be taken care of by a lever movable in two directions. A last knob 46 can control the picture change. When there is a strip or a short film roll with pairs of slides this changing can be done with a rotating movement of the knob. When there is a disc with pairs of slides the rotating movement of the knob can likewise be used to obtain the correct position of the disc. If electronic equipment is provided and when frame graduations are exceeded runner 5 gives an indication which pair of slides abutting to this limit is required, for instance, by pushing this knob 46 the indicated pair of slides can automatically be positioned. On reaching the limit of this pair of partial slides 2x-9x, measuring mark 61 of runner 5 can also give an indication which connecting pair of partial slides must be positioned. In that case then runner 5 must manually be moved, however, to the correct position on the new pair of slides.

If the device is placed in a moving vehicle, it is useful to project simultaneously with the map the direction of movement with respect to the map. This can be accomplished, by projecting a mirrored picture of a compassneedle on or by the side of the projection screen. In a more complex embodiment of the device, the movement of runner 5 can be coupled with the speed vector of the vehicle.

In the above an application is described of the projection device in which the carrier contains slides of maps or plans, and the pictures occur on the same place of screen 1 by the convergence of the converging optical axes of both projection screens in point 11 of this screen.

If there is more space available the optical axes need not intersect on the screen, but the projections of the 2 series and of the 9 series can be projected side-by-side on the screen. Light sources 3 and 10 then need not be switched on one at a time, but can operate simultaneously, each producing a picture of a slide of a pair of slides.

The device according to the invention, can be used for reading slides that contain subject matter other than maps, for instance, alpha-numerical data such as directories. The slides of series 2 then carry localizing information such as the capitals, whereas the slides of the 9 series carry the detailed information. For this embodiment, a magnification other than 1:5 can be employed, for instance 1:10, so that it is possible to place more information in a compact manner. A 91 to 9x slide then can produce 100 times as much information than slide 2 and can be read particularly quickly with the device according to the invention.

Depending on the technically possible maximal projection enlargement, it is possible to project a number rather than a pair of pictures, each first slide again being scanned by a runner and all other slides by a lens of their own that is fixedly connected with the runner, and each following lens having a greater magnification than the previous one, while the amount of detail increases in each following slide in accordance with the magnification.

Figure 5:
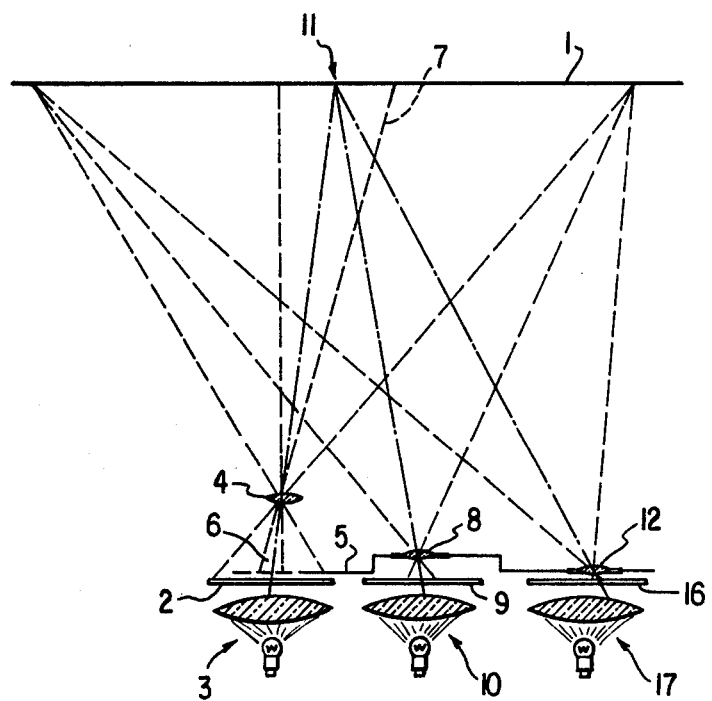
FIG. 5 is a view similar to that of FIG. 1 illustrating an embodiment of the projection device according to the invention provided with three projection systems.

Such an arrangement is shown in FIG. 5, which differs from that of FIG. 1 in that it is equipped with three projection systems. The first two of those systems are identical to those shown in FIG. 1, and bear corresponding reference numerals. The third system includes a lens 12, also mounted on runner 5 and aligned with an associated light source 17. Between lens 12 and source 17, there is disposed a third slide 16 carrying an image of the same scene as slides 2 and 9. Slide 16 could present still more details than slide 9. Lens 12 is shown as disposed closer to slide 16 than is lens 8 to slide 9, indicating that lens 9 will provide a greater image magnification than does lens 8. Slide 16 is positioned relative to slides 2 and 9 so that the portion of slide 16 which is projected onto screen 1 at any given time will correspond to the portion of slide 2 at the center of window 6.

I claim:

1. A projection device comprising:
   a projection screen presenting a surface defining an image projection area;
   means defining a first area to be occupied by a first diapositive carrying a pictorial representation of a given subject;
   a first optical system arranged to project an image of the entirety of the first area onto said screen in a manner such that the image fills substantially the entire image projection area;
   means defining a second area to be occupied by a second diapositive carrying a pictorial representation of the same subject, and to the same scale, as the first diapositive;
   a second optical system producing a greater magnification than said first optical system and arranged to project an image of a portion constituting a fractional part of the second area onto said screen in a manner such that the image of such portion fills substantially the entire image projection area; and
   a transparent runner movable parallel to the first and second areas and provided with a window located adjacent the first area and corresponding in size to a portion of the first area, said runner carrying at least part of said second optical system at a location relative to said window such that the location of the portion of the first area which is adjacent said window corresponds to the location of the portion of said second area which said second optical system is arranged to project on said screen.

2. An arrangement as defined in claim 1 wherein both of said optical systems are arranged in a manner such that their main axes intersect at the projection screen surface and so that the image of the entire first area and the image of the portion of the second area can be projected onto the same location of the projection screen, and each of said optical systems comprises a respective, individually controllable light source for enabling a selected one of the images to be projected onto said projection screen by switching on one of said light sources.

3. An arrangement as defined in claim 1 wherein the projection of the image of the portion of said second area is of substantially the same size as that of the image of said first area.

4. An arrangement as defined in claim 1 wherein said runner is arranged for movement in two mutually transverse directions parallel to said first area, said window is provided with a visible mark, and the projected image of the portion of said second area corresponds to the region surrounding the point of the first area which coincides with the mark.

5. An arrangement as defined in claim 1 wherein at least one of said optical systems comprises light reflecting means for reflecting light rays in the optical path between the area associated with said optical system and said projection screen.

6. An arrangement as defined in claim 5 wherein said reflecting means are associated with said second optical system and provide an even number of reflecting surfaces.

7. An arrangement as defined in claim 1 wherein said means defining a first area and said means defining a second area together comprise a carrier for holding two diapositives each bearing a pictorial representation of the same scene, but with the second diapositive of the pair carrying a representation containing a greater amount of picture detail than the first diapositive of the pair.

8. An arrangement as defined in claim 1 further comprising means defining at least one further area to be occupied by at least one further diapositive carrying a pictorial representation of the given subject, and at least one further optical system arranged to project an image of a portion of a respective further area onto said screen in a manner such that the image of such portion fills substantially the entire image projection area with each one of the first, second and further diapositives carrying a progressively more detailed representation of the given subject and each of said first, second and further optical systems producing progressively greater degrees of subject magnifications.

* * * * *